United States Patent [19]

Hori et al.

[11] Patent Number: 5,290,893

[45] Date of Patent: Mar. 1, 1994

[54] METHARCYLATE PREPOLYMER CONTAINING TRIAZINE RING STRUCTURE, ITS PREPARATION, AND SETTING COMPOSITION AND RESIN

[75] Inventors: Yutaka Hori, Yokkaichi; Takashi Kamiya, Chita; Takayuki Mano, Gifu; Ryuzo Asami, Nagoya, all of Japan

[73] Assignee: Aica Kogyo Co., Ltd., Japan

[21] Appl. No.: 884,401

[22] Filed: May 18, 1992

[30] Foreign Application Priority Data

May 20, 1991 [JP] Japan .................. 3-114894

[51] Int. Cl.$^5$ .................. C08F 226/06; C08F 220/10; C07D 251/54
[52] U.S. Cl. .................. 526/261; 526/328.5; 544/196
[58] Field of Search .................. 526/261, 328.5; 544/196, 204, 208

[56] References Cited

FOREIGN PATENT DOCUMENTS

| 2111003 | 9/1972 | Fed. Rep. of Germany . |
|---|---|---|
| 31-7915 | 9/1956 | Japan . |
| 33-3542 | 5/1958 | Japan . |
| 47-39238 | 10/1972 | Japan . |
| 48-22524 | 3/1973 | Japan . |
| 48-67387 | 9/1973 | Japan . |
| 49-9539 | 1/1974 | Japan . |
| 49-14536 | 2/1974 | Japan . |
| 49-17890 | 2/1974 | Japan . |
| 49-30466 | 3/1974 | Japan . |
| 49-24132 | 6/1974 | Japan . |
| 50-16725 | 2/1975 | Japan . |
| 52-6738 | 1/1977 | Japan . |
| 54-4993 | 1/1979 | Japan . |
| 54-61292 | 5/1979 | Japan . |
| 54-61293 | 5/1979 | Japan . |
| 57-18717 | 1/1982 | Japan . |
| 57-18718 | 1/1982 | Japan . |
| 57-23617 | 2/1982 | Japan . |
| 57-100119 | 6/1982 | Japan . |
| 58-152013 | 9/1983 | Japan . |
| 58-180533 | 10/1983 | Japan . |
| 61-272209 | 2/1986 | Japan . |
| 63-286414 | 11/1988 | Japan . |
| 63-286426 | 11/1988 | Japan . |
| 628150 | 8/1949 | United Kingdom . |
| 1247230 | 9/1971 | United Kingdom . |

OTHER PUBLICATIONS

T. J. Giacobbe; R. H. Yocum and E. B. Nyquist; "Syntheses of Monomers from Hydroxyethyl Acrylate and Methylolmelamine Which Polymerize by Low Doses of Radiation"; Jan. 1, 1971, The Dow Chemical Company, pp. 630-632.

Primary Examiner—Joseph L. Schofer
Assistant Examiner—Wu C. Cheng
Attorney, Agent, or Firm—Davis, Bujold & Streck

[57] ABSTRACT

An aminotriazine prepolymer is provided which gives resin with toughness and favorable trans-Darency without use of filler agent by mixing 2-hydroxyethyl methacrylate (781 g: 6 mole), melamine (126 g: 1 mole), 95% by weight of p-formaldehyde (189 g: 6 mole as formaldehyde), p-toluene sulfonate (3.0 g), hydroquinone monomethyl ether (0.2 g) in a two liter separation flask with a stirring device, a thermometer, an air-inlet tube, and a cooling tube for removing the distillate. The mixture is heated while air is blown in. After the melamine and paraformaldehyde are dissolved in 2-hydroxyethyl methacrylate, at the temperature of 80° C. to 100° C., the reaction is continued in the temperature range of 105° C. to 115° C. until the quantity of extracted water is 108 g (6 mole). The triazine ring structure-containing methacrylate prepolymer thus obtained has a viscosity of 2,000 cP at 20° C., a bromine number of 92.1 (Br g/100 g), and a Gardner color degree of not greater than 5.

8 Claims, No Drawings

METHARCYLATE PREPOLYMER CONTAINING TRIAZINE RING STRUCTURE, ITS PREPARATION, AND SETTING COMPOSITION AND RESIN

BACKGROUND OF THE INVENTION

The present invention relates to novel acrylate prepolymers or methacrylate prepolymers that contains triazine ring structure (hereinafter referred to as methacrylate prepolymer containing a triazine ring structure); its manufacture, and to a setting composition which includes the prepolymer which is polymerizable on the site of ethylene unsaturated bonding; and a resin material prepared by curing the setting composition.

Resins containing a triazine ring structure, for example, melamine resin, have excellent insulating characteristics and favorably high hardness and are thus used for manufacturing electric parts and paints. The resins are, however, quite brittle, and thus the resin by itself is not at all usable for the above purposes. Melamine resin is typically mixed with a required amount of a filling agent or alternatively is reinforced with fibers so as to be made tough and strong.

When the resin is made into resin glass or a resin lens, a large quantity of a filling agent or fibers are mixed with the resin to give sufficient mechanical strength to the molded resin. The large amount of a filling agent or fibers, however, make the molded material opaque, thus preventing the resin glass or resin lens from attaining adequate performance.

There is a great demand for development of an aminotriazine containing-prepolymer, which gives sufficient toughness and strength to a setting material including the prepolymer without use of a filling agent or reinforcing fiber.

SUMMARY OF THE INVENTION

A primary objective of the invention is to provide a novel methacrylate prepolymer which contains a triazine ring structure.

A more specific objective of the invention is to provide a methacrylate prepolymer which contains a triazine ring structure useful as a setting material having desireble toughness and strength.

Another objective of the invention is to provide a simple process for manufacturing such a prepolymer.

Further objectives of the invention include providing a setting composition including the prepolymer and a resin material prepared by curing the setting composition.

Other general and specific objectives of the invention will in part be obvious and will in part appear hereinafter.

The invention attains the foregoing objectives with a methacrylate prepolymer containing triazine ring structure, expressed as formula (1).

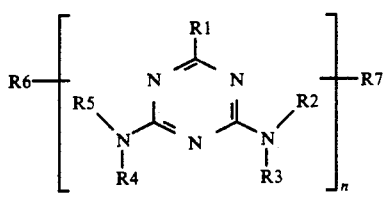

[formula (1)]

wherein n is an integer from one to ten; $R_1$ is selected from the functional groups chosen from the formulae consisting of:

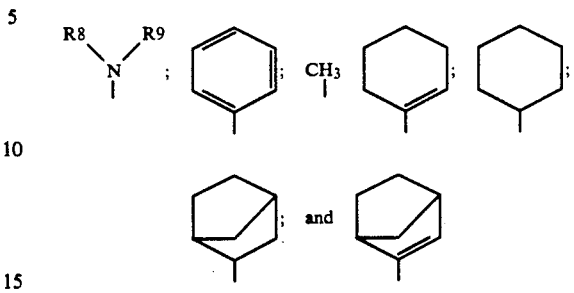

$R_2$, $R_3$, $R_4$, $R_5$, $R_8$, and $R_9$ are independently selected from the functional radials of the group consisting of hydrogen radicals, and divalent functional groups such as $-CH_2-$ and $-CH_2OCH_2-$; where the radical $-CH_2OCH_2-$ links triazine rings;

$R_6$ and $R_7$ are monovalent functional groups selected from the group of radicals consisting of hydroxyl radicals and groups with ethylene unsaturated bonding such as a radical represented by formula (3), $R_6$ and $R_7$,are terminal groups to the $-CH_2-$radicals of $R_2$, $R_3$, $R_4$, $R_5$, $R_8$, and $R_9$, and are not bound to a triazine ring.

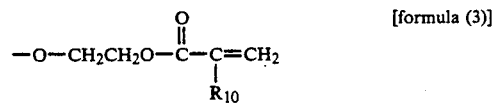

[formula (3)]

wherein at least one functional group expressed as formula (3) is present in the prepolymer; and $R_{10}$ is either a $-H$ radical or $-CH_3$ radical.

The triazine ring group is synthesized from an aminotriazine compound, paraformaldehyde, and 2-hydroxyethyl methacrylate and has the average molecular weight of about 200 to 8,000.

The methacrylate prepolymer which contains a triazine ring structure shown above is prepared by dissolving the aminotriazine compound and paraformaldehyde in 2-hydroxyethyl methacrylate and reacting the three constituents.

Another feature of the invention is a setting composition comprising the methacrylate prepolymer which contains the triazine ring structure shown above and an addition polymerization initiator which reacts with the ethylene unsaturated bonding.

The invention also include the triazine ring structure-containing methacrylate resin material prepared by polymerizing the setting composition by reaction of the ethylene unsaturation.

A further feature of the invention is another setting composition including the triazine ring structure containing methacrylate prepolymer; 2-hydroxyethyl methacrylate, and an addition polymerization initiator acting on the ethylene unsaturation.

The invention also provides a triazine ring structure-containing methacrylate resin prepared by copolymerizing the latter setting composition by reacting the ethylene unsaturation.

Formulas (4) through (6) represent examples of the triazine ring structure-containing methacrylate prepolymer described above; the prepolymers (4) and (5) are examples where n=1; and the prepolymer (6) is an example where n=3.

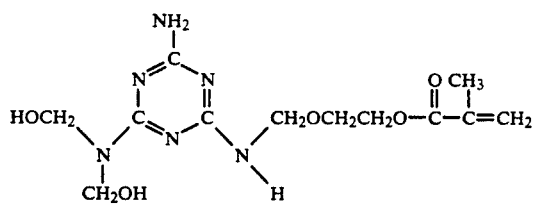

[formula (4)]

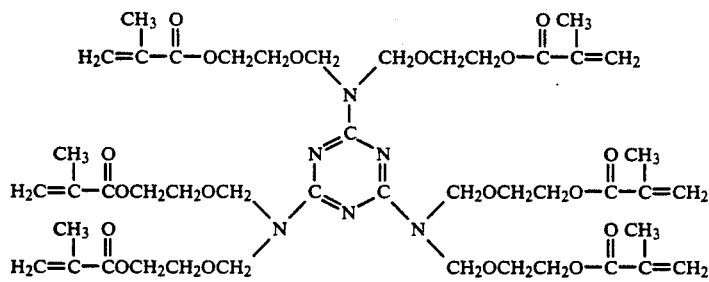

[formula (5)]

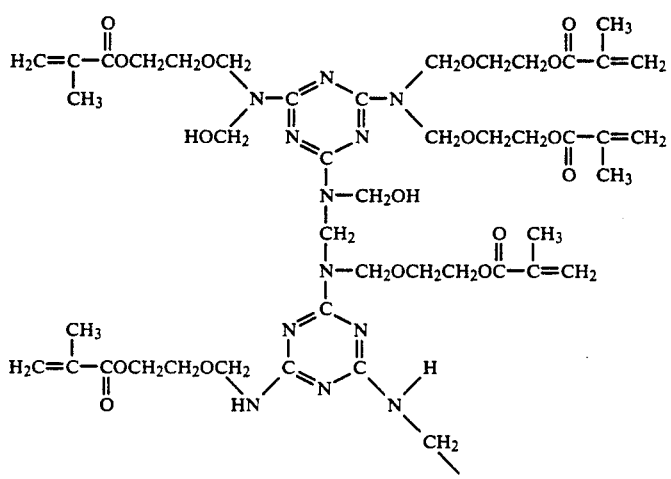

[formula (6)]

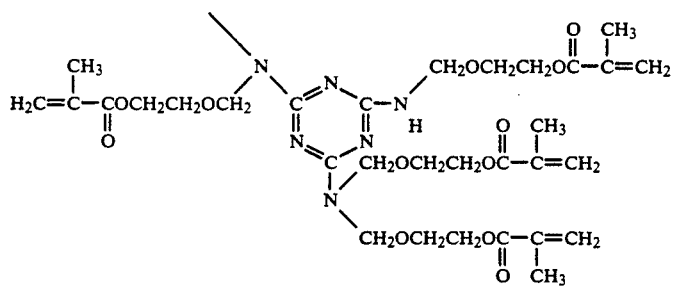

When the degree of polymerization n, is eleven or more, the resultant prepolymer has undesirably high viscosity and is not suitable for required applications. The preferable molecular weight of the prepolymer is in the rage of two-hundred (800) to eight-thousand (8,000).

The acrylate used in the invention to be bound to the triazine ring by condensation is either 2-hydroxyethyl acrylate or 2-hydroxyethyl methacrylate (herein referred to as 2-hydroxyethyl methacrylate).

The prepolymer is synthesized by making p-formaldehyde and 2-hydroxyethyl methacrylate react with the aminotriazine compound as one system. This reaction proceeds without adding any solvent since both the aminotriazine compound and p-formaldehyde are soluble in 2-hydroxyethyl methacrylate.

Organic synthesis without a solvent makes the synthesized compound, that is, the prepolymer, free from any additional solvent, thus allowing the prepolymer to have a wide range of applications. Although p-formaldehyde is generally used in water, non-use of the solvent in the invention keeps the reaction system from containing excessive water. This feature of the invention prevents melamine rings from being linked in synthesis of the prepolymer and accelerates the bonding of the melamine ring with 2-hydroxyethyl methacrylate.

Some quantity of unreacted 2-hydroxyethyl methacrylate remains after the synthesis of the prepolymer. When the triazine ring structure-containing methacrylate prepolymer, including a certain amount of the unreacted 2-hydroxyethyl methacrylate, is addition-polymerized, a copolymer of 2-hydroxyethyl methacrylate and the triazine ring structure-containing methacrylate prepolymer is produced. The addition polymerization may be executed to yield the single body of the triazine ring structure-containing methacrylate prepolymer after the unreacted 2-hydroxyethyl methacrylate is removed. The p-formaldehyde is in a sufficient amount to affect the synthesis as formaldehyde and too small in a quantity to act on the addition polymerization.

The prepolymer of the invention is prepared without any additional solvent. Polymerization for curing the prepolymer is not by condensation polymerization of the triazine ring, but rather addition polymerization on the site of the ethylene unsaturation. Accordingly, no component is removed from the prepolymer, and substantially no foaming or deformation of the resin material is observed before and after polymerization. The resin material thus prepared has sufficient hardness and toughness without adding any filling agent, and also possesses superior transparency. The addition polymerization by reacting with the ethylene unsaturation gives tenacity to the resin, and the triazine ring structure in the polymerized molecule causes sufficient hardness.

The resin itself is relatively tough and strong and hence does not require any filler agents or fibers for reinforcement. Furthermore, the resin is cured by addition polymerization, and foaming due to separate substance from polymerization is not observed in the cured resin. The resin of the invention thus has favorable transparency. A filler agent or fibers may be added to the resin in some applications so as to give further toughness and strength to the resin.

The constituents and synthesis of the triazine ring structure-containing methacrylate prepolymer are described in detail.

(1) 2-hydroxyethyl methacrylate

As described above, the term 2-hydroxyethyl methacrylate includes 2-hydroxyethyl acrylate and/or 2-hydroxyethyl methacrylate. Hereinafter methacrylate includes acrylate analogs.

Other compounds having ethylene unsaturated bonding including at least one hydroxyl group may be used in place of 2-hydroxyethyl methacrylate, as appropriate. Examples of such compounds include 2-hydroxypropyl methacrylate, polyethylene glycol monomethacrylate, polypropylene glycol (monomethacrylate), trimethylolpropane monomethacrylate, trimethylolpropane dimethacrylate, allyl alcohol, ethylene glycol allyl ether, glycerol (mono, di)allyl ether, N-methylol (meth-)acrylamide and N-methyol acrylamide, and mixtures thereof. Here glycerol (mono, di)allyl ether represents glycerol monoallyl ether and/or glycerol diallyl ether.

(2) Aminotriazine Compound

The aminotriazine compound has such structure that three carbon atoms of the triazine ring, that is, $C_3N_3$, are respectively bonded to amino groups, and represents either an aminotriazine or an aminotriazine derivative. An example of the aminotriazine is melamine, and the aminotriazine derivatives include benzoguanamine, acetoguanamine, cyclohexane carboguanamine, cyclohexene carboguanamine, norbornane carboguanamine, and norbornene carboguanamine.

Any one of the above aminotriazine compounds or mixture thereof are used in synthesis of the prepolymer.

Alternatively, other compounds reactive with formaldehyde, such as ureas, ketones, and phenols, may be made to react with formaldehyde in the same reaction system as the aminotriazine compound when conditions such as the required characteristics and cost performance are fulfilled.

(3) P-formaldehyde

P-formaldehyde, which is solid at ordinary temperatures is used as the source of formaldehyde. In the system of the invention, p-formaldehyde is dissolved with the aminotriazine compound in 2-hydroxyethyl methacrylate, and thus no additional process for dehydration or solvent removal is required. Unreacted p-formaldehyde (paraformaldehyde) is gasified to formaldehyde and removed from the reaction mixture during the synthesis of the prepolymer. No process for recovering unreacted paraformaldehyde is required either.

(4) Synthesis of Prepolymer

The methacrylate prepolymer containing triazine ring structure of the invention is prepared according to either of the following two processes: A. dehydration, condensation, and etherification through reaction of the methylol group introduced to the aminotriazine compound from p-formaldehyde with the hydroxyl group of 2-hydroxyethyl methacrylate; and B. dehydration, condensation, and etherification through reaction of the aminotriazine compound and hemiacetal of 2-hydroxyethyl methacrylate and formaldehyde.

In the synthesis of the prepolymer, the aminotriazine compound and p-formaldehyde are dissolved in 2-hydroxyethyl methacrylate, which is liquid at room temperature. Namely, the synthetic reaction efficiently proceeds in one system. An adequate amount of toluene, alcohol, or alcohol-containing formalin may be added to the reaction system so as to decrease the viscosity or to yield an azeotrype with water.

The molar ratio of the three constituents, the aminotriazine compound, the p-formaldehyde, and the 2-hydroxyethyl methacrylate, may vary with the type of the material and required properties of the resultant cured substance. When melamine is used as the aminotriazine compound under non-solvent reaction, the preferred mole ratio of melamine to p-formaldehyde is one to two or greater, and that of melamine to 2-hydroxyethyl methacrylate is also one to two or greater.

When the fraction of p-formaldehyde with respect to melamine is lower than the above value, or alternatively, when the ratio of 2-hydroxyethyl methacrylate to melamine is less than the above limit, solubility of melamine is lowered and melamine may gel by self condensation.

The synthesis of the prepolymer is implemented by condensation reaction, and the progress of the synthesis is related to the quantity of water removed through the condensation reaction. The condensation reaction can thus be stopped at any desirable stage by measuring the quantity of water up to a predetermined amount. The rate of extraction of water varies with various factors including the reaction temperature, stirring efficiency, the catalyst, the volume of blown air, and the solvent.

Although the synthetic reaction of the prepolymer proceeds without a catalyst, organic or inorganic alkalis such as sodium hydroxide, sodium carbonate, ammonia, and triethylamine may be added to the reaction while mixing to enhance the solubility of the aminotriazine compound or accelerate the etherification. Inorganic or organic acids such as p-toluene sulfonate, which is a common etherification catalyst, and hydrochloric acid may be used before or during the reaction to accelerate the etherification.

Since ethylene unsaturation always exists in the reaction system, the material of the prepolymer may undesirably gel by addition polymerization of the ethylene unsaturation during the synthesis. Phenol or amine polymerization inhibitors may be added to the reaction system, and/or oxygen, preferably, air, which also acts as a polymerization inhibitor may be blown in the reaction system during the process of synthesis to avoid addition reactions. Blowing in air accelerates removal of water in the condensation reaction to shift the equilibrium to the side for producing the ether.

The reaction temperature, which efficiently prevents gelation of the material and proceeds the target reaction, ranges between 50° C. and 150° C., and more preferably between 70° C. and 130° C. The preferable reaction time is 0.5 to 10 hours. The reaction may be implemented under- reduced pressure for accelerated removal of water.

(5) Product (Prepolymer)

The methacrylate prepolymer containing triazine ring structure thus prepared is a compound including a methacrylate group, an alkyl ether group, and/or a methylol, amino, and/or methylene groups as well as the triazine ring.

The average molecular weight of the prepolymer ranges between 200 and 8,000, which is varied by controlling the mixing temperature, the reaction temperature, and/or the volume of water removed. When the average molecular weight is greater than 8,000, the resultant prepolymer has undesirably high viscosity and is not suitable for application. On the other hand, when the average molecular weight is less than two hundred, the prepolymer does not possess desirable properties and performances.

The prepolymer is a colorless, transparent, and viscous liquid, which does not require any specific purification although it may be washed with water according to the purposes.

The curing process of the prepolymer to prepare the setting composition and the resin is hereinafter described in detail.

The setting composition of the invention typically, includes the triazine ring structure-containing methacrylate prepolymer prepared in the above process and a polymerization initiator. The composition may further include a compound applicable to condensation reaction, an accelerator for the condensation reaction, a compound containing ethylene unsaturation, a compound containing isocyanate, a catalyst for producing urethane bonding, and other compounds.

(1) POLYMERIZATION INITIATOR

The polymerization initiator initiates addition polymerization on the site of the ethylene unsaturation in the prepolymer, and is chosen corresponding to the curing process.

For curing at ordinary temperatures, cobalt-methyl ethyl ketone peroxide or benzoyl peroxide-dimethyl aniline is preferably used; for curing at moderate temperatures, di-isopropyl peroxy dicarbonate, benzoyl peroxide, t-butyl peroxy-2-ethyl hexanoate, t-butyl peroxy neodicanate, azo-bis-isobutyronitrile, or azo-bis-diethylvaleronitrile; for curing at high temperatures, t-butyl hydroperoxide, cumene hydroperoxide, or t-butyl perbenzoate; and for UV curing, benzophenone, benzoin ether, or anthraquinone.

(2) COMPOUND APPLICABLE TO CONDENSATION REACTION

The compound which can be condensed with the methylol group or alkyl ether group, in the setting composition contains a carboxyl group, a hydroxyl group, an amino group, a methylol group, or an alkyl ether group. Examples of such compounds include alkyd resins, amino resins such as melamine resins, urea resins, and benzoguanamine resins, acrylic copolymers, and polyester resins.

(3) ACCELERATOR FOR CONDENSATION REACTION

The accelerator added to the composition in combination with the above compound (2) may be organic or inorganic acids used as an acrylic or amino accelerator for curing the resin, or alkanolamines used as a potential curing agent.

(4) COMPOUND CONTAINING UNSATURATED BONDING

The compound may be copolymerizable with the methacrylate group in the prepolymer of the invention and selected according to the required properties and characteristics of the composition. Examples of such compounds include styrene, 2-hydroxyethyl methacrylate, methyl methacrylate, hexanediol dimethacrylate, polyethylene(propylene) glycol dimethacrylate, trimethylolpropane trimethacrylate, acrylonitrile, vinyl ester resin, urethane methacrylate, diallyl phthalate, unsaturated polyester resin, methyl methacrylate prepolymer, and mixtures thereof.

(5) COMPOUND CONTAINING ISOCYANATE

The compound is reactive with the active hydrogen of hydroxyl group, methylol group, or amino group in the prepolymer of the invention. Some examples of such compound include isocyanate monomer, adducted substance, allophanate-denatured body, biuret-denatured body, isocyanurate-denatured body, carbodiimide-denatured body, urethane prepolymer, and block isocyanate. The aromatic isocyanate compounds may be used when high transparency is not necessary while the aliphatic or alicyclic isocyanate compounds may be used for high transparency.

(6) CATALYST FOR PRODUCING URETHANE BONDING

The catalyst is used in combination with the above compound (5). The reaction of the active hydrogen in the prepolymer of the invention with isocyanate to produce the urethane bonding proceeds without a catalyst. However, amine or organic metal catalysts are preferably added to the reaction system for enhanced productivity and curing process.

(7) OTHER COMPOUNDS

The setting composition of the invention may further include other compounds according to the required properties being sought.

Examples of such compounds include: filling agents, such as calcium carbonate, aluminum hydroxide, resin powder, and pulp; reinforcing agents, such as glass fibers, carbon fibers, metal fibers, and whiskers; ultraviolet absorbing agents, such as benzophenones, salicylates, benzotriazols, acrylonitriles, metal oxides, and hindered amines; organic and inorganic foaming agents;

flame retardants; antistatic agents; lubricants; coloring agents; solvents; oxidation inhibitors; and plasticizers such as dioctyl phthalate and dibutyl phthalate.

(8) CURING PROCESS

The setting composition of the invention includes at least one ethylene unsaturation site in the molecule. The composition may thus be cured through radical polymerization and ionic polymerization at ordinary temperatures, with application of heat, or with exposure to the ultraviolet rays (or high energy beams such as alpha ray, beta ray, gamma ray, neutron beam, X-ray, and electronic beam).

Since the setting composition typically includes the methylol group and amino group, the composition may be cured after preparation of the solid prepolymer by taking advantage of the reactivity of these functional groups (for example, condensation reaction of the hydroxyl group, or addition reaction of the multi-functional isocyanate with the hydroxyl group and amino group).

DETAILED DESCRIPTION OF THE PREFERRED EMBODIMENTS

Example 1

2-hydroxyethyl methacrylate (781 g: 6 mole), melamine (126 g: 1 mole), 95% by weight of p-formaldehyde (189 g: 6 mole as formaldehyde), para-toluene or p-toluene sulfonic acid (3.0 g), hydroquinone monomethyl ether (0.2 g) were mixed in a two liter separation flask with a stirring device, a thermometer, an air-inlet tube, and a cooling tube for removing the distillate. The mixture was heated while air was blown in. After the melamine and the p-formaldehyde were dissolved in the 2-hydroxyethyl methacrylate at a temperature of 80° C. to 100° C., the reaction was continued in the temperature range of 105° C. to 115° C. until 108 g of water was extracted (6 mole). The triazine ring structure-containing methacrylate prepolymer thus obtained had a viscosity of 2,000 cP at 20° C., a bromine number of 92.1 (Br g/100 g), and a Gardner color degree of not greater than 5.

EXAMPLE 2

A mixture, the same as described in Example 1, underwent the similar reaction by using the same device and applying the same method as example 1 except the quantity of extracted water was 90 g (5 mole). The triazine ring structure-containing methacrylate prepolymer thus obtained had a viscosity of 1,500 cP at 20° C., a bromine number of 91.8 (Br g/100 g), and a Gardner color degree of not greater than 5.

Example 3

2-hydroxyethyl acrylate (697 g: 6 mole), melamine (126 g: 1 mole), 95% by weight of p-formaldehyde (189 g: 6 mole as formaldehyde), p-toluene sulfonic acid (2.7 g), hydroquinone monomethyl ether (0.2 g) were mixed in the same device, and was allowed to react in the same manner as described in Example 1.

The triazine ring structure-containing acrylate prepolymer thus obtained had a viscosity of 2,500 cP at 20° C., a bromine number of 96.8 (Br g/100 g), and a Gardner color degree of not greater than 5.

The resins prepared from the prepolymer of examples 1 - 3 were not changed at all in properties after one-year storage at room temperature.

Setting Compositions A Through F

Setting compositions A through F including the prepolymer of either Example 1 through Example 3 were prepared according to the combination of Table 1. Each composition obtained was injected into a mold, which had the space of three or ten millimeter formed by two 30cm×30cm glass plates. The compositions were then cured according to the curing process shown in Table 1 to yield the resin materials. The properties of the resin materials are shown in Table 2 together with those of references G and H explained below.

Reference G

Thirty-seven percent by weight of formalin (2.5 mole as formaldehyde) was added to 1 mole of melamine. After the pH of the mixture was adjusted to 9.0 with NAOH, the mixture was heated for dissolution and methylol formation. The mixture, whose pH was adjusted to 5.6 with formic acid, was aged at 80° C. and condensed to yield water-soluble melamine resin containing 60 percent by weight of solid substance.

After p-toluene sulfonate (0.5 parts by weight) as a curing accelerator was added to the mixture, a sheet of linter paper (120 g/m$^2$) was impregnated with the resin mixture at the impregnation factor of 100 percent (the weight ratio of linter paper to melamine resin was one to one) and dried. Plural sheets of the impregnated paper were laminated to have the thickness of three or ten millimeters, and were molded under the pressure of 100 kg/cm$^2$ and at the temperature of 140° C. to give a laminated plate.

Reference H

Commercially available polymethyl methacrylate plates of three and ten millimeter thicknesses were also used as references.

TABLE 1

| CONSTITUENTS/COMPOSITIONS | EXAMPLES A THROUGH F L | | | | | | COMPOUNDS ACTUALLY USED |
| --- | --- | --- | --- | --- | --- | --- | --- |
| | A | B | C | D | E | F | |
| PREPOLYMER OF EXAMPLE 1 | 100 | | 100 | 50 | 95 | 50 | |
| PREPOLYMER OF EXAMPLE 2 | | 100 | | | | | |
| POLYESTER RESIN | | | | 40 | | 40 | UNSATURATED ORTHO POLYESTER RESIN |
| STYRENE | | | | 10 | | 10 | |
| ISOCYANATE COMPOUND | | | | | 5 | 5 | HEXAMETHYLENE DIISOCYANATE |
| AMINO RESIN | | 5 | | | | | HEXAMETHOXY METHYL MELAMINE |
| CURING AGENT A | 1 | 1 | | 1 | 1 | 1 | 55% METHYL ETHYL KETONE PEROXIDE DILUTED WITH DIMETHYL PHTHALATE |
| CURING AGENT B | | | 1 | | | | t-BUTYL PEROXY |

TABLE 1-continued

| CONSTITUENTS/COMPOSITIONS | EXAMPLES A THROUGH F L | | | | | | COMPOUNDS ACTUALLY USED |
|---|---|---|---|---|---|---|---|
| | A | B | C | D | E | F | |
| ACCELERATOR A | 0.3 | 0.3 | | 0.3 | | 0.3 | NEODYCANATE COBALT NAPHTHENATE (Co: 6%) |
| ACCELERATOR B | | | | | 0.01 | 0.01 | TIN DIBUTYL DILAURATE |
| CURING PROCESS | A | B | C | A | A | A | |

CURING PROCESS A: POST-CURING AT 80° C. AFTER CURING AT ORDINARY TEMPERATURE
CURING PROCESS B: HEATING UP TO 160° C. AFTER CURING AT ORDINARY TEMPERATURE
CURING PROCESS C: POST-CURING AT 120° C. AFTER CURING AT 50° C.

TABLE 2

| COMPOSITIONS PROPERTIES | EXAMPLES | | | | | |
|---|---|---|---|---|---|---|
| | A | B | C | D | E | F |
| APPEARANCE | LIGHT BROWN TRANSPARENT | SAME AS A | COLORLESS TRANSPARENT | LIGHT BROWN TRANSPARENT | SAME AS D | SAME AS D |
| BENDING STRENGTH (kg/mm$^2$) | 6.0 | 5.4 | 6.0 | 10.0 | 8.3 | 12.3 |
| BENDING ELASTIC MODULES (kg/mm$^2$) | 466 | 480 | 452 | 435 | 426 | 414 |
| PENCIL HARDNESS (H) | 9 | 9 | 9 | 6 | 9 | 6 |
| TEMPERATURE OF THERMAL DEFORMATION (°C.) | 179 | 182 | 176 | 132 | 185 | 145 |
| WATER ABSORPTION RATIO ON BOILING | 1.60 | 0.79 | 1.62 | 1.45 | 0.80 | 1.04 |
| (CHANGE OR NO CHANGE) | NO CHANGE | NO CHANGE | NO CHANGE | NO CHANGE | NO CHANGE | NO CHANGE |
| REFLECTION RATIO | — | — | 1.54 | — | — | — |
| ABBE'S NUMBER | — | — | 53.5 | — | — | — |

| COMPOSITIONS PROPERTIES | REFERENCES | | METHOD OF TEST |
|---|---|---|---|
| | G | H | |
| APPEARANCE | OPAQUE | COLORLESS TRANSPARENT | |
| BENDING STRENGTH (kg/mm$^2$) | 10 | 12 | JIS K 6911 5.17 |
| BENDING ELASTIC MODULES (kg/mm$^2$) | 800 | 340 | SAME AS ABOVE |
| PENCIL HARDNESS (H) | 6 | 3 | JIS K 5400 6.14 |
| TEMPERATURE OF THERMAL DEROMATION (°C.) | 205 | 100 | JIS K 7207 METHOD A |
| WATER ABSORPTION RATIO ON BOILING | 2.1 | 1.07 | JIS K 6919 5.2.7 |
| (CHANGE OR NO CHANGE) | NO CHANGE | NO CHANGE | |
| REFLECTION RATIO | — | 1.49 | JIS K 7105 5.1 |
| ABBE'S NUMBER | — | 55 | SAME AS ABOVE |

Setting Composition 2

A setting composition was obtained by mixing the prepolymer of Example 2 according to the combination of Table 3. The composition was aged at room temperature to have substantially no stickiness on the surface, injected into the mold, and molded at 130° C. with application of pressure for five minutes. The properties of the composition are shown in Table 4.

TABLE 3

| CONSTITUENTS | PARTS BY WEIGHT |
| --- | --- |
| PREPOLYMER OF EXAMPLE 2 | 90 |
| HEXAMETHYLENE DIISOCYANATE | 10 |
| TIN DIBUTYL DILAURATE | 0.01 |
| t-BUTYL PERBENZOATE | 1.5 |
| ZINC STEARATE | 2 |
| CALCIUM CARBONATE | 150 |
| GLASS FIBER (1 INCH) | 107 |

TABLE 4

| PROPERTIES | VALUES MEASURED | METHOD OF TEST |
| --- | --- | --- |
| BENDING STRENGTH (kg/mm$^2$) | 20.5 | JIS K 6911 5.17 |
| IZOD IMPACT VALUE (kg-cm/cm) | 40.0 | JIS K 7110 |
| BARCOL HARDNESS | 75.0 | JIS K 6919 5.2.5 |
| TEMPERATURE OF THERMAL DEFORMATION (°C.) | >250 | JIS K 7207 METHOD A |

Although the composition included large quantities of filling agents such as zinc stearate, calcium carbonate, and glass fibers and is thus opaque, the properties thereof indicate that the composition gives sufficiently tough and strong resin material.

Setting Composition 3

Another setting composition was obtained by adding 3 percent by weight of a photopolymerization initiator (sold under the trade name of Darocur 1173 by Merck) to 100 parts by weight of the prepolymer of Example 3. The composition was applied onto a PMMA plate to have the thickness of 50 micrometers (by doctor blade method,) and irradiated with ultraviolet rays from a 57W/cm high-pressure mercury lamp (distance: 10 cm; illumination of ultraviolet rays: 45 mW/cm$^2$). The composition was cured through photopolymerization to yield the resin material. The properties of the resin material are shown in Table 5.

TABLE 5

| PROPERTIES | EXAMPLE | REFERENCE H | METHOD OF TEST |
| --- | --- | --- | --- |
| PENCIL HARDNESS (H) | 5 | 3 | JIS K 5400 6.14 |
| SURFACE HARDNESS (SEC) | 10 | — | TACK FREE TIME |
| SCRATCH RESISTANCE | NOT EASILY SCRATCHED | EASILY REFERENCE H | OBSERVING THE SCRATCH WITH NAKED EYES AFTER RUBBING LIGHTLY WITH STEEL WOOL #0000 |
| CIGARETTE RESISTANCE | NO TRACE OBSERVED | SOME TRACE OBSERVED | OBSERVING THE TRACE WITH NAKED EYES AFTER LEAVING THE LIT CIGARETTE ON THE APPLIED LAYER FOR ONE MINUTE |

As described above, the prepolymer of each example may be applied to the setting composition as the sole body, or be mixed with the unsaturated bonding-containing compound and/or the isocyanate compound. Alternatively, the prepolymer of example may be denatured with the unsaturated bonding-containing compound and/or the isocyanate compound before being mixed with the setting composition.

Various properties of the resin, including water resistance, heat resistance, flexibility, hardness, and adhesiveness, are improved by varying the combination of the constituents of the setting composition, and selecting adequate denaturation processes. Since the prepolymer and the resin of the invention are denatured in numerous ways, the invention is applicable to various molding processes such as injection molding and transfer molding, and may employ a wide range of processing agents of paint, paper, and timber and resin denaturing agents.

The setting composition or the resin attains excellent properties without any filling agent or denaturation agent. The resin materials prepared by curing the setting compositions (setting compositions A through F and 3 in the example) are colorless, transparent, and tough compared with conventional resins (references G and H), and are thus superior optical materials such as resin glass and resin lens. Moreover, the resin materials of the invention are readily and inexpensively manufactured. The triazine ring structure in the molecule gives the resin excellent heat resistance, chemical resistance, weather resistance, hardness, and electric characteristics.

As described above, the resin materials obtained by curing the setting compositions including the prepolymer of the invention is sufficiently tough and strong without any filling agent, and moreover possesses preferable transparency. The resin material of the invention is thus favorably applicable to optical materials such as resin glass and resin lens, and also applicable to various molding processes including injection molding and transfer molding.

What is claimed is:

1. A method for preparing a methacrylate prepolymer containing triazine ring structure expressed as the formula:

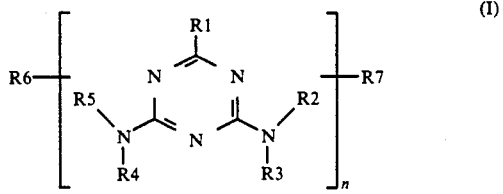

(I)

where, the value of n is one the average from 1 to 10; R1 is

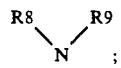

R2, R3, R4, R5, R8, and $9 are radicals selected from hydrogen radicals and divalent functional radicals such as —CH₂— and —CH₂OCH₂—; where the radical —CH₂OCH₂— links triazine rings;

R6 and R7 are monovalent functional radicals selected from hydroxyl radicals and functional radicals with ethylene unsaturation as denoted by the formula:

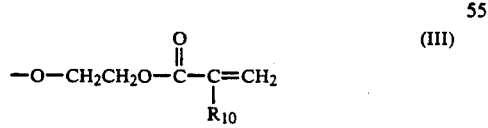

(III)

and where R6 and R7 are bonded as terminal groups to the —CH₂— radical of R2 through R5, R8 and R9 which are unbound to a triazine ring; at least one functional group expressed as formula (III) exists in the prepolymer; and R10 is either a hydrogen radical or CH₃;

synthesized from an aminotriazine compound, a p-formaldehyde, and a 2-hydroxyethyl methacrylate, with the aminotriazine compound having an average molecular weight to 200 to 8,000;

said method comprising the step of:

mixing the aminotriazine compound and the p-formaldehyde with the 2-hydroxyethyl methacrylate to form a mixture consisting of the three constituents with each other as one system at a temperature in the range of about 70° C. to 150° C. while blowing one of oxygen and air into the mixture for dissolution.

2. A method in accordance with claim 1, wherein the aminotriazine compound is melamine.

3. A method in accordance with claim 1, further comprising the step of:

stopping the reaction when a quantity of water removed from the reaction system amounts to a predetermined value.

4. A method in accordance with 2, wherein the mole ratio of melamine to 2-hydroxyethyl is 1:2 or less.

5. A method in accordance with claim 2, wherein the mole ratio of melamine to 2-hydroxyethyl methacrylate is 1:2.

6. A method in accordance with claim 1, wherein at least one of an organic and inorganic alkali is added to the mixture as a catalyst, said at least one of an organic and inorganic alkali is selected from the group consisting of sodium hydroxide, sodium carbonate, ammonia, and triethylamine.

7. A method in accordance with claim 1, wherein at least one of an inorganic or organic acid is added to the mixture as a catalyst, said at least one of an organic and inorganic acid is selected from the group consisting of paratoluene sulfonate and hydrochloric acid.

8. A method for preparing a methacrylate prepolymer containing triazine ring structure expressed as the formula:

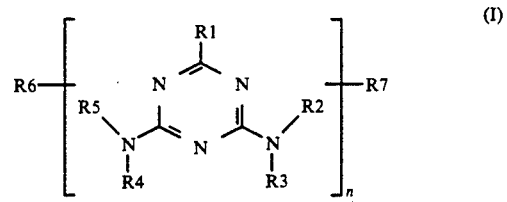

(I)

where, the value of n is one the average from 1 to 10; R1 is

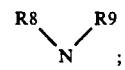

R2, R3, R4, R5, R8, and R9 are radicals selected from hydrogen radicals and divalent functional radicals such as —CH₂— and —CH₂OCH₂—; where the radical —CH₂OCH₂— links triazine rings;

R6 and R7 are monovalent functional radicals selected from hydroxyl radicals and functional radicals with ethylene unsaturation as denoted by the formula:

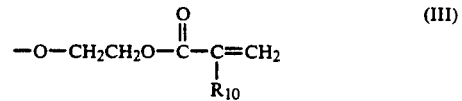

(III)

and where R6 and R7 are bonded as terminal groups to the —CH$_2$— radical of R2 through R5, R8 and R9 which are unbound to a triaxine ring; at least one functional group expressed as formula (III) exists in the prepolymer; and R10 is either a hydrogen radical or CH$_3$;

synthesized in a single step reaction, without use of a solvent, from an aminotriazine compound, having an average molecular weight to 200 to 8,000, a p-formaldehyde, and a 2-hydroxyethyl methacrylate;

said method comprising the single step of:

forming a three constituent mixture by dissolving the aminotriazine compound and the p-formaldehyde in the 2-hydroxyethyl methacrylate; and heating said mixture, to react the three constituents, at a temperature in the range of about 70° C. to 150° C. while blowing one of oxygen and air into the mixture for dissolution.

* * * * *